(12) United States Patent
Hall et al.

(10) Patent No.: US 6,823,015 B2
(45) Date of Patent: Nov. 23, 2004

(54) MACROBLOCK CODING USING LUMINANCE DATE IN ANALYZING TEMPORAL REDUNDANCY OF PICTURE, BIASED BY CHROMINANCE DATA

(75) Inventors: Barbara A. Hall, Endwell, NY (US);
Agnes Y. Ngai, Endwell, NY (US);
John M. Sutton, Endicott, NY (US);
Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/055,395

(22) Filed: Jan. 23, 2002

(65) Prior Publication Data

US 2003/0138048 A1 Jul. 24, 2003

(51) Int. Cl.⁷ .................................... H04B 7/66
(52) U.S. Cl. .................................... 375/240.24
(58) Field of Search ............... 375/240.01, 240.03, 375/240.04, 240.05, 240.16, 240.17, 240.19, 240.21, 240.24, 240.25; 348/415.1, 416.1; 341/67; 711/171; 382/232, 234; H04B 7/66

(56) References Cited

U.S. PATENT DOCUMENTS

| | | | |
|---|---|---|---|
| 5,587,803 A | | 12/1996 | Inoue et al. .................. 386/33 |
| 5,613,091 A | * | 3/1997 | Stone et al. .................. 711/171 |
| 5,703,966 A | | 12/1997 | Astle .......................... 382/236 |
| 5,844,607 A | | 12/1998 | Gebler et al. ................. 348/390 |
| 5,883,672 A | * | 3/1999 | Suzuki et al. ................ 375/240.04 |
| 6,654,418 B2 | * | 11/2003 | Haskell et al. ................ 375/240.03 |
| 6,690,307 B2 | * | 2/2004 | Karczewicz ................... 341/67 |

* cited by examiner

Primary Examiner—Tung T. Vo
(74) Attorney, Agent, or Firm—William H. Steinberg, Esq.; Kevin P. Radigan, Esq.; Heslin Rothenberg Farley & Mesiti P.C.

(57) ABSTRACT

A technique is provided for encoding macroblocks of a frame of a sequence of video frames initially employing luminance data only to analyze temporal redundancy of the macroblocks within the frame. Upon deciding to code at least one macroblock as a non-intra macroblock, the technique includes considering whether to switch the coding decision for the at least one macroblock from non-intra to intra by evaluating chrominance data of the at least one macroblock. The evaluating of the chrominance data can include determining whether chrominance difference data, obtained by comparing chrominance values of a current macroblock with a reference macroblock, is greater than a user set chrominance difference threshold, and if so then the technique includes switching the macroblock coding decision. As a further qualification, the switching might occur only if the chrominance difference data is also greater than the corresponding luminance difference data.

20 Claims, 6 Drawing Sheets

⊗ O ⊗ O   ⋯   O

⊗ O ⊗ O   ⋯   O

⊗ O ⊗ O   ⋯   O

⋮ ⋮ ⋮ ⋮       ⋮

⊗ O ⊗ O   ⋯   O

O LUMINANCE DATA (Lx,y)
X CHROMINANCE DATA (Cb)x,y; (Cr)x,y

O LUMINANCE DATA (Lx,y)
X CHROMINANCE DATA (Cb)x,y; (Cr)x,y

*fig. 5B*

MACROBLOCK CODING USING LUMINANCE DATE IN ANALYZING TEMPORAL REDUNDANCY OF PICTURE, BIASED BY CHROMINANCE DATA

TECHNICAL FIELD

This invention relates in general to compression of digital visual images, and more particularly, to a technique for encoding macroblocks of a frame of a sequence of video frames using luminance data to analyze temporal redundancy of macroblocks within the frame, and when a decision to non-intra code a macroblock is made, subsequently re-evaluating the decision using chrominance data to determine whether to switch the macroblock to intra coding.

BACKGROUND OF THE INVENTION

Technological advances in digital transmission networks, digital storage media, very large scale integration devices, and digital processing of video and audio signals have been converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, an assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

The ISO MPEG-2 compression standard specifies only the syntax of bitstream and semantics of the decoding process. The choice of coding parameters and trade-offs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

DISCLOSURE OF THE INVENTION

As noted, in the field of video coding, an aspect of many compression algorithms (such as the MPEG-2 standard), is a reliance upon temporal redundancy. Temporal redundancy refers to the similarity between two pictures to be coded. When two pictures or frames have similar content, significant savings in the amount of data required to code the frames is realized by coding the differences between the pictures, rather than their entire content. When pictures are digitized, their contents are described by numeric values which represent color and brightness. Each picture element or pixel is qualified as a number or a set of numbers. For most applications, these numbers represent the RGB values of the pixel, or more commonly, the luminance (Y) and chrominance (Cr,Cb).

Large amounts of data are required to represent a picture. For example, an NTSC picture of 720×480 pixels in a 4:2:0 chroma format with one byte each for Y, Cr and Cb, requires 518,400 bytes. In view of this, a search to analyze the temporal redundancy of a picture is typically done on one type of data, which is conventionally the luminance or Y data. Applicants have discovered that for certain pictures, this can lead to erroneous conclusions with respect to the similarities of the two pictures. The Y data may be quite close in value between pictures, while the Cr and/or Cb data may be quite different. In such a case, if a difference coding (i.e., inter-coded macroblock) decision is made rather than a complete code (i.e., intra-coded macroblock), poor visual results may occur when the encoded pictures are subsequently decoded and displayed.

To avoid this problem, disclosed herein is a technique for selectively checking whether a Cr Cb difference against a threshold is exceeded (i.e., checking in a macroblock that has been chosen as an inter-coded macroblock by the Y search), and when exceeded, to reverse the macroblock coding decision, thereby changing the decision to code the macroblock to intra macroblock coding.

Briefly summarized, the present invention comprises in one aspect a method for encoding macroblocks of at least one frame of a sequence of video frames. The method includes encoding at least one macroblock of the frame by deciding, using luminance data of the at least one macroblock, to code the at least one macroblock as a non-intra macroblock; and subsequently re-evaluating the coding decision for the at least one macroblock and switching the coding decision for the at least one macroblock from non-intra to intra if consideration of chrominance data of the at least one macroblock requires a change.

Systems and computer program products corresponding to the above-summarized methods are also described and claimed herein.

To restate, applicants recognize herein that coding a macroblock as non-intra (inter) when the actual chrominance versus reference chrominance data widely differs, leads to larger loss in the compression (i.e., quantization) stage of encoding, resulting in visual artifacts such as blockiness, coefficient clipping errors, etc. Thus, picture quality is improved herein by monitoring the chrominance difference data and subsequently switching a decision to code a macroblock to intra-code the macroblock should the chrominance difference data exceed a defined threshold. This actually reduces the bits required to code the macroblock and picture, since coding a macroblock as non-intra when the actual versus reference chrominance data widely differs results in an increased number of bits used to code the macroblock. More non-zero coefficients in the quantized block (i.e., a predictable result of large differences between actual versus reference pixel values), causes the variable length encode (VLE) to use larger (i.e., more bits) run-length codes and fixed length escape codes as defined by MPEG-2 DCT coefficients tables.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 5a & 5b illustrate positioning of luminance and chrominance signals in 4:2:2 frame format and 4:2:0 frame format, respectively.

BEST MODE FOR CARRYING OUT THE INVENTION

Figure 1:
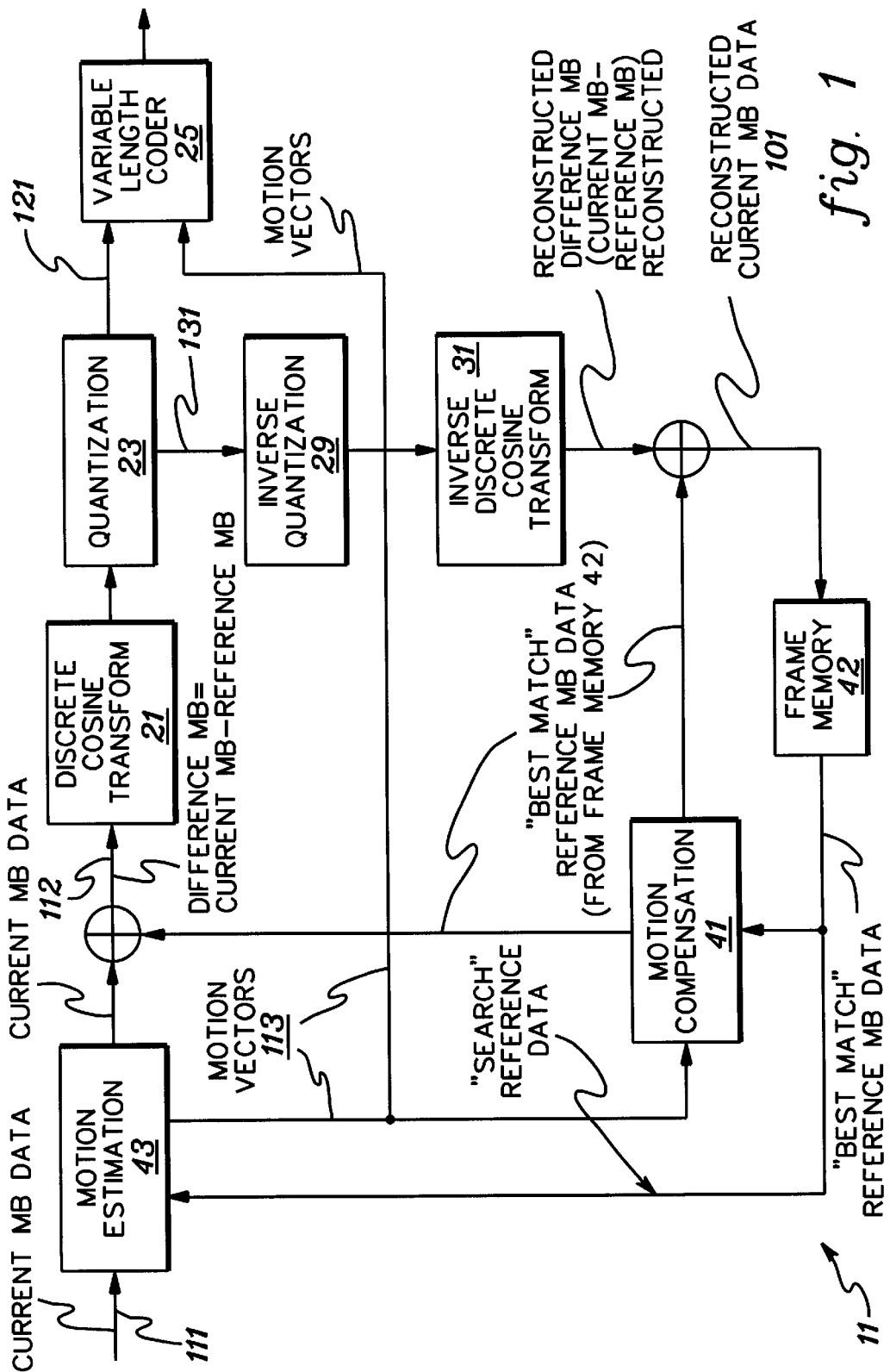
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve a desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

One method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I–P–B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
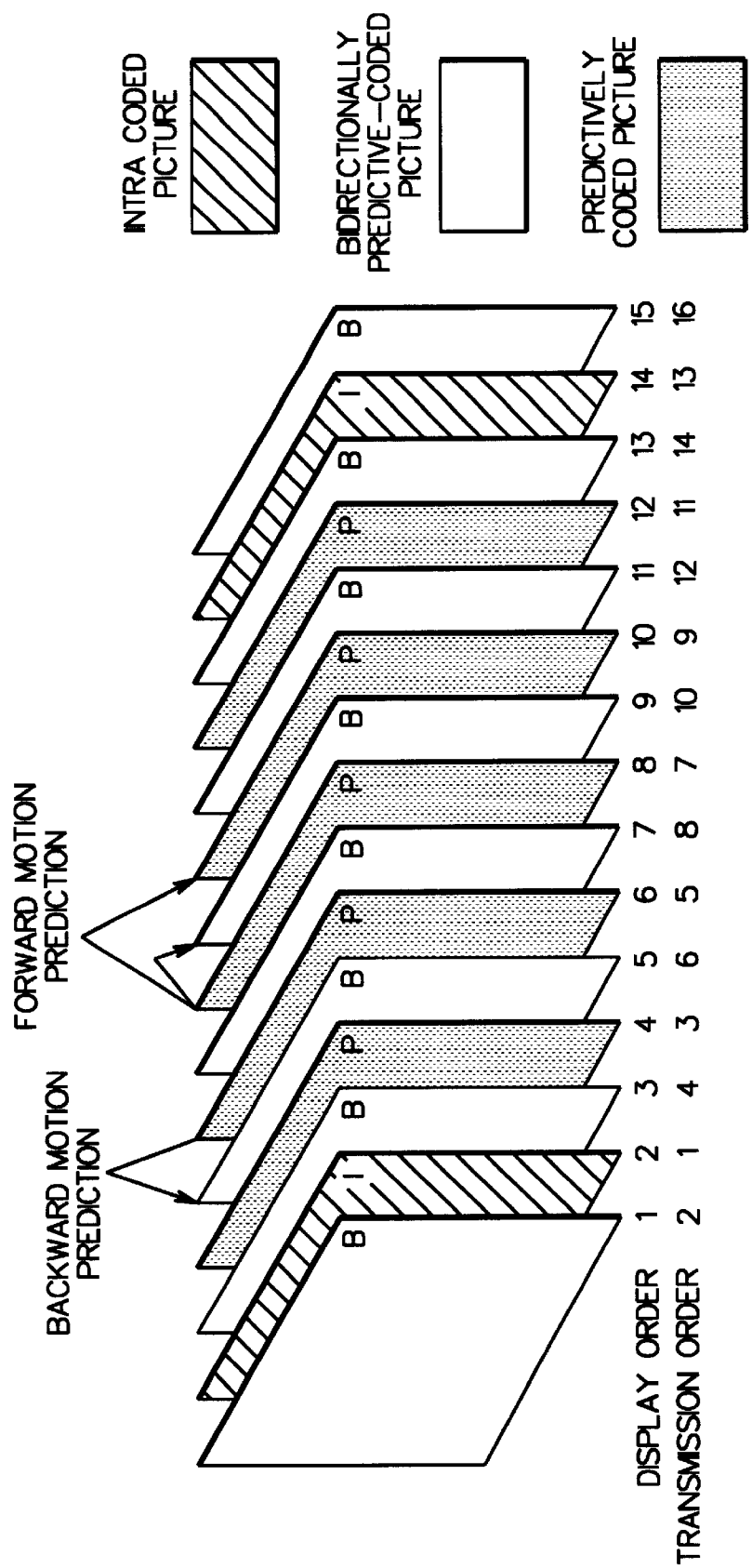
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
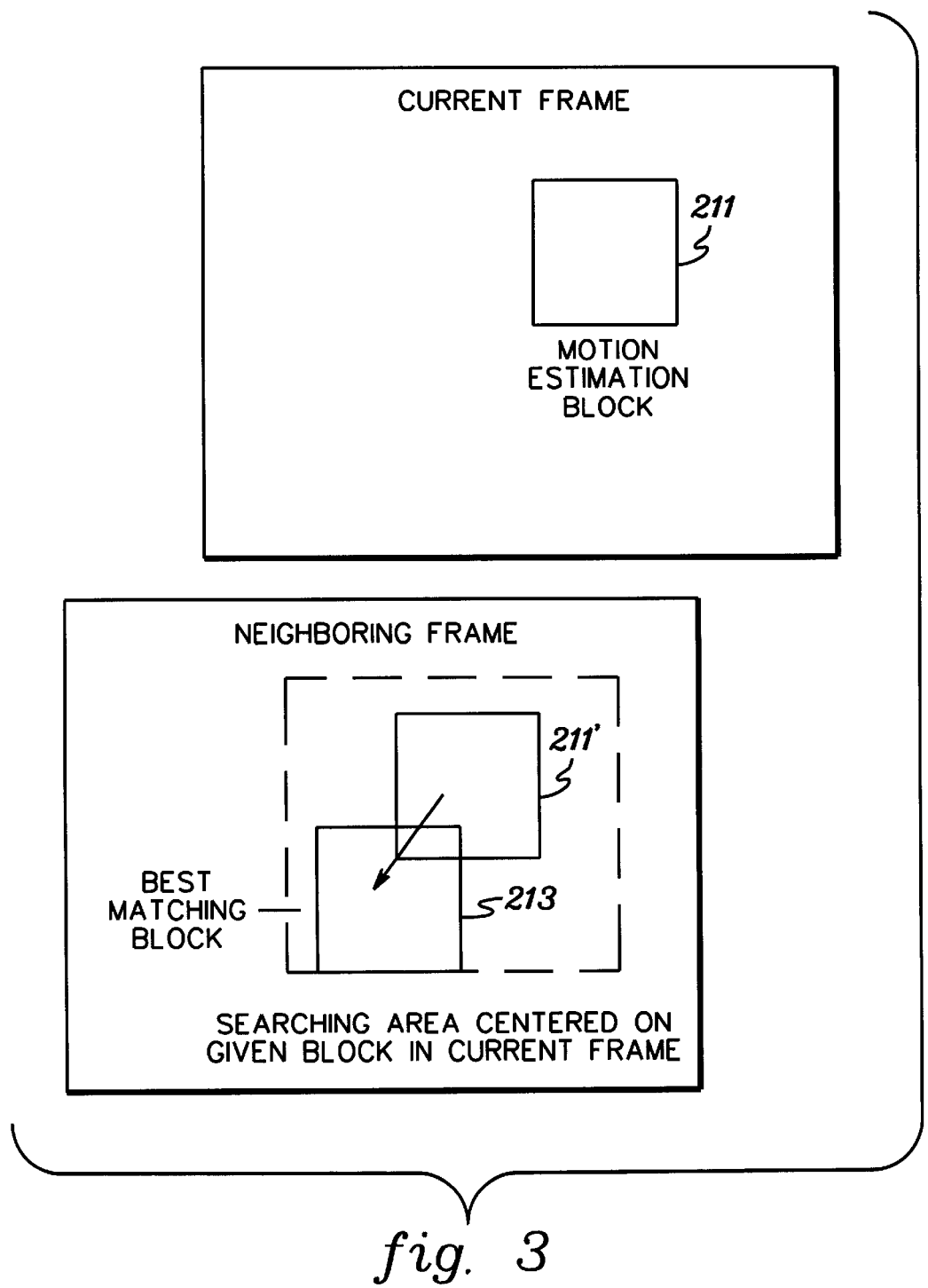
FIG. 3 illustrates the search from the motion estimation block in the current frame or picture to the best matching block in a subsequent or previous frame or picture. Elements 211 and 211' represent the same location in both pictures.
Figure 4:
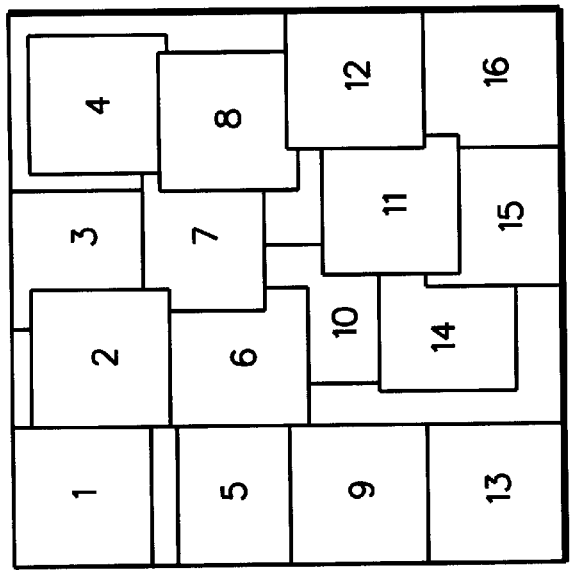
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, processing searches for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in further detail in U.S. Pat. No. 6,118,823 by Carr et al., entitled "Control Scheme For Shared-Use Dual-Port Predicted Error Array," which is hereby incorporated herein by reference in its entirety.

As noted, in the field of video coding, many compression algorithms (such as the MPEG-2 standard), rely upon temporal redundancy. Temporal redundancy refers to the similarity between two pictures that are to be coded. When two pictures or frames have similar content, significant savings in the amount of data required to code the frames is realized by coding the differences between the pictures, rather than their entire content. When pictures are digitized their contents are described by numeric values which represent brightness and color. Each picture element or pixel is qualified as a number or a set of numbers. For most applications, these numbers represent the RGB values of the pixel, or more commonly, the luminance (Y) and chrominance (Cr,Cb). FIGS. 5a & 5b represent positioning of luminance and chrominance samples for 4:2:2 and 4:2:0 picture data, respectively.

Large amounts of data are required to represent a picture. In view of this, a search to analyze the temporal redundancy of a picture is typically done on one type of data, which is conventionally the luminance or Y data. Applicants have discovered that for certain pictures, this can lead to erroneous conclusions with respect to the similarities of the two pictures and may even produce color artificats between pictures. The Y data may be quite close in value between pictures, while the Cr and/or Cb data may be quite different. If a difference coding (i.e., inter-coded macroblock) decision is made rather than a complete code (i.e., intra-coded macroblock) poor visual results may occur when the encoded pictures are subsequently decoded and displayed.

To avoid this problem, disclosed herein is a technique for checking whether a Cr Cb difference against a threshold is exceeded (in a macroblock that has been chosen to be inter-coded by the Y search), and if so, to reverse the macroblock coding decision, thereby changing the decision to code the macroblock to an intra macroblock. This technique, which in one embodiment could be implemented within the motion estimation logic 43 of the encoding process of FIG. 1, is described further below.

As noted, the macroblock coding type decision is typically based on luminance (luma) data only, since changes in luma data are generally more perceptible to a viewer. The conventional decision to code a macroblock can be expressed as follows:

If (N>IntraThreshold) and (N>$MB_{ACT}$) then coding type=
  Intra
Else
  coding type=Inter (Non-Intra)
Where:
  IntraThreshold=2048
  N=Best Match sum of differences between the current macroblock and the reference macroblock
  $MB_{ACT}$=Activity measurement of the current macroblock.

Note that N and $MB_{ACT}$ are conventionally derived solely from luma data. Chrominance (chroma) data is not used in these calculations.

Figure 6:
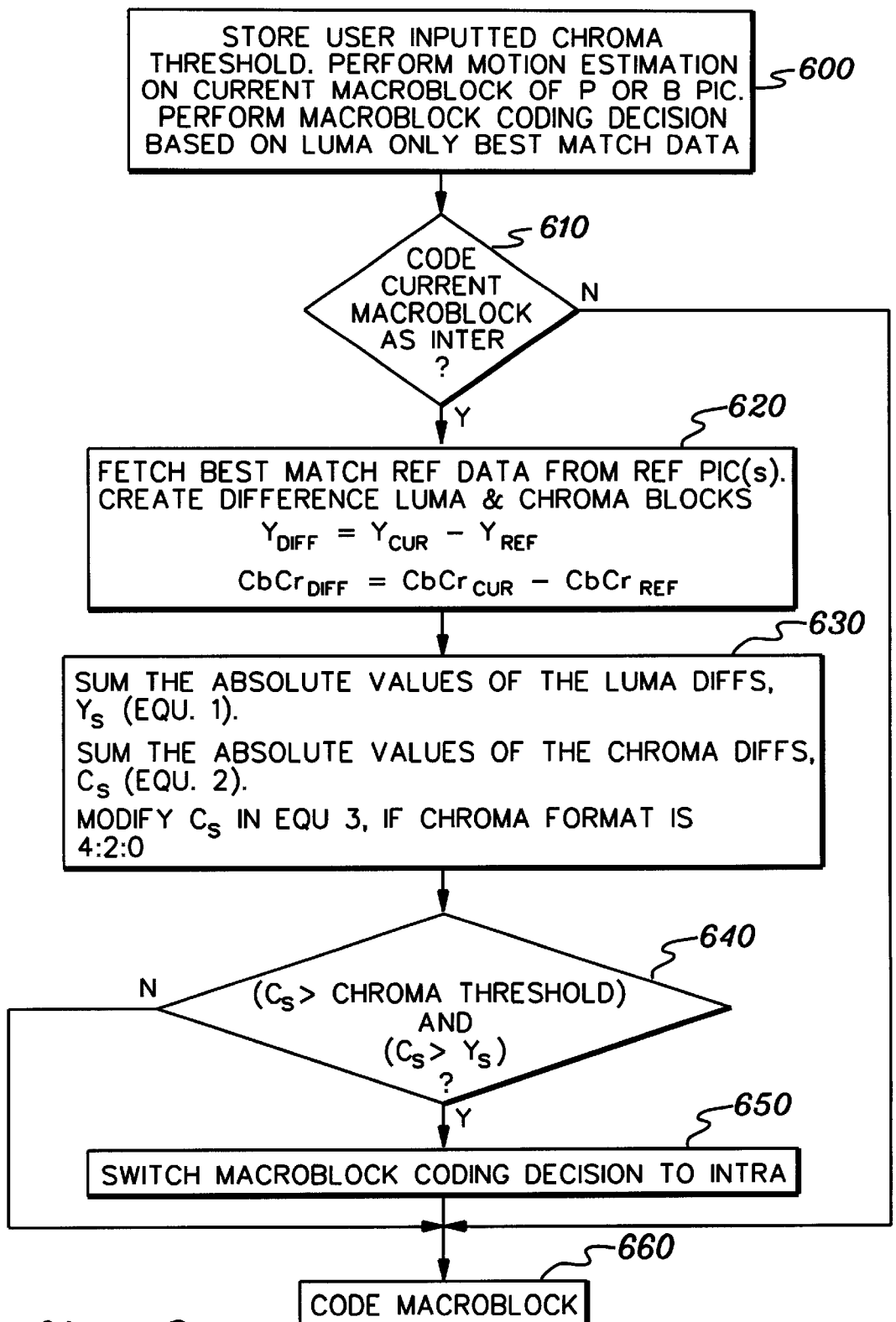
FIG. 6 illustrates one embodiment of a process for coding macroblocks in accordance with an aspect of the present invention. This process includes initially determining that a current macroblock is to be inter-coded based on luminance data only. Subsequently, the processing evaluates whether the coding decision for the current macroblock should be changed from non-intra to intra based upon chrominance values of the macroblock.

One embodiment of a real-time encoding technique in accordance with an aspect of the present invention is depicted in FIG. 6. This chroma biased processing initially receives and stores a user inputted chroma threshold value for subsequent use in comparison with a summation of the absolute values of the chroma differences between the current macroblock and a best match reference macroblock. The chrominance difference threshold may be set by experimentation, or by employing user knowledge obtained from previously encoding a similar source.

Motion estimation is performed on a current macroblock of a P or B picture. This includes using the best matching data to perform a macroblock coding decision based on luminance values only 600. After this decision, processing determines whether the current macroblock is to be coded non-intra 610. If "no", meaning that the macroblock is to be coded intra, then the macroblock is simply coded intra 660 and the logic proceeds to process a next macroblock employing the same process flow of FIG. 6.

Assuming that the initial decision is to code the current macroblock as non-intra, then processing fetches the best matching reference data from the reference picture(s), and creates difference luminance and chrominance blocks, wherein $Y^{diff}=YC_{ur}-Y_{ref}$, and Cb $Cr_{diff}$=Cb, $Cr_{cur}$–Cb $Cr_{ref}$ 620.

The sum of the absolute values of the luminance difference Ys for the pixels of the macroblock can be obtained using equation (1).

$$Y_s = \sum_{i=0}^{i=16} \sum_{j=0}^{j=16} |CurY_{ij} - RefY_{ij}| \qquad (1)$$

In addition, the sum of the absolute values of the chrominance difference Cs for the pixels of the macroblock can be obtained using equation (2).

$$C_s = \sum_{i=0}^{i=n} \sum_{j=0}^{j=8} [(|CurC_{b_{ij}} - RefC_{b_{ij}}|) + (|CurC_{r_{ij}} - RefC_{r_{ij}}|)] \qquad (2)$$

n=8 if 4:2:0 chroma format
n=16 if 4:2:2 chroma format
Cur Cb, Cur Cr=current chroma macroblock (8×n)
Ref Cb, Ref Cr=reference chroma macroblock (8×n),
Note that if the chroma format is 4:2:0, then Cs is multiplied by 2, i.e. Cs=Cs·2 for 4:2:0 format 630.

The summation of the chrominance differences is then compared to see whether it is greater than the defined chroma threshold. In addition, in this embodiment, a comparison is made to determine whether the summation of the chrominance difference is greater than the summation of the luminance difference 640. If neither condition is met, then the macroblock remains non-intra coded 660. Otherwise, the macroblock coding decision is switched so that the macroblock will be intra coded 650, which is followed by the macroblock coding 660. Note that as an alternative, the summation of the chrominance difference values Cs could simply be compared against the chrominance threshold in making the decision whether to switch the coding type.

To summarize, presented herein is a real-time technique for checking chrominance (Cr/Cb) differences in a macroblock that has been chosen conventionally to be non-intra coded by the Y search. The checking is performed against a chrominance threshold, which can be user defined, and if that threshold is exceeded the macroblock coding decision is reversed, changing the decision to intra coding.

More particularly, after making an inter-coded macroblock decision based on luma data only, the encoder hardware fetches the best matched chroma data resulting from the luma search. At the time it creates the difference macroblock, the magnitude of the differences for luma and chroma are calculated by accumulating the absolute differences of the pixel values and summing them. In one embodiment, the chroma sum is compared to a pre-defined threshold and is also compared to the luma sum. If it exceeds both of these values, the inter-coding decision is converted to an intra-coding decision, and the macroblock is coded intra. With the availability of programmable thresholds and conditional enablement of this feature, video quality can be improved with little additional design overhead required.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of encoding macroblocks of at least one frame of a sequence of video frames, said method comprising:
   encoding macroblocks of a frame of a sequence of video frames, said encoding comprising for at least one macroblock of the frame:
   (i) deciding, using luminance data of the at least one macroblock, to code the at least one macroblock as a non-intra macroblock; and
   (ii) switching the coding decision for the at least one macroblock from non-intra to intra upon evaluating chrominance data of the at least one macroblock.

2. The method of claim 1, wherein the evaluating of the chrominance data of the at least one macroblock comprises creating chrominance difference data by comparing chrominance values of a current macroblock of the at least one macroblock with chrominance values of a best matching reference macroblock, and determining whether the chrominance difference data is greater than a set chrominance difference threshold.

3. The method of claim 2, wherein the chrominance difference threshold is user set.

4. The method of claim 2, wherein the evaluating further comprises obtaining luminance difference data for the current macroblock of the at least one macroblock by comparing luminance data of the current macroblock and luminance data of the best matching reference macroblock, and determining whether the chrominance difference data is greater than the luminance difference data, wherein said switching occurs if the chrominance difference data is greater than said chrominance difference threshold, and the chrominance difference data is greater than the luminance difference data.

5. The method of claim 4, wherein the chrominance difference data comprises the sum of chrominance difference values of each macroblock of the at least one macroblock compared with chrominance values of its reference macroblock by the equation:

$$C_s = \sum_{i=0}^{i=n} \sum_{j=0}^{j=8} [(|CurC_{b_{ij}} - RefC_{b_{ij}}|) + (|CurC_{r_{ij}} - RefC_{r_{ij}}|)]$$

wherein
n=8 if 4:2:0 chroma format
n=16 if 4:2:2 chroma format
Cur Cb, Cur Cr=current chroma macroblock (8×n)
Ref Cb, Ref Cr=reference chroma macroblock (8×n),
and $C_s = C_s \times 2$, if chroma format is 4:2:0; and
wherein the luminance difference data comprises a summation of luminance differences for each macroblock of the at least one macroblock compared with luminance values of its reference macroblock, Ys being determined as:

$$Y_s = \sum_{i=0}^{i=16} \sum_{j=0}^{j=16} |CurY_{ij} - RefY_{ij}|$$

wherein
Cur Y=luminance values for current macroblock
Ref Y=luminance values for reference macroblock.

6. The method of claim 1, wherein said evaluating comprises fetching best match reference data from a reference picture, and obtaining a chrominance difference for each pixel of each macroblock of the at least one macroblock, said chrominance difference comprising a chrominance value of the current macroblock pixel less a chrominance value of the corresponding reference macroblock pixel, and wherein said evaluating further comprises summing the absolute values of the chrominance differences for the pixels of the at least one macroblock to arrive at a summation of the chrominance difference data, and determining whether the summation of the chrominance difference data is greater than a predefined chrominance threshold, and if so, then proceeding with said switching of the coding decision for the at least one macroblock from non-intra to intra.

7. The method of claim 1, further comprising repeating the encoding for multiple frames of the sequence of video frames.

8. A system for encoding macroblocks of at least one frame of a sequence of video frames, the system comprising:
   means for encoding macroblocks of a frame of a sequence of video frames, said means for encoding comprising for at least one macroblock of the frame means for:
   (i) deciding, using luminance data of the at least one macroblock, to code the at least one macroblock as a non-intra macroblock; and
   (ii) switching the coding decision for the at least one macroblock from non-intra to intra upon evaluating chrominance data of the at least one macroblock.

9. The system of claim 8, wherein the means for evaluating the chrominance data of the at least one macroblock comprises means for creating chrominance difference data by comparing chrominance values of a current macroblock of the at least one macroblock with chrominance values of a best matching reference macroblock, and means for determining whether the chrominance difference data is greater than a set chrominance difference threshold.

10. The system of claim 9, wherein the chrominance difference threshold is user set.

11. The system of claim 9, wherein the means for evaluating further comprises means for obtaining luminance difference data for the current macroblock of the at least one macroblock by comparing luminance data of the current macroblock and luminance data of the best matching reference macroblock, and means for determining whether the chrominance difference data is greater than the luminance difference data, wherein said means for switching proceeds if the chrominance difference data is greater than said chrominance difference threshold, and the chrominance difference data is greater than the luminance difference data.

12. The system of claim 11, wherein the chrominance difference data comprises the sum of chrominance difference values of each macroblock of the at least one macroblock compared with chrominance values of its reference macroblock by the equation:

$$C_s = \sum_{i=0}^{i=n} \sum_{j=0}^{j=8} \left[\left(\left|CurC_{b_{ij}} - RefC_{b_{ij}}\right|\right) + \left(\left|CurC_{r_{ij}} - RefC_{r_{ij}}\right|\right)\right]$$

wherein n=8 if 4:2:0 chroma format n=16 if 4:2:2 chroma format

Cur Cb, Cur Cr=current chroma macroblock (8×n)

Ref Cb, Ref Cr=reference chroma macroblock (8×n), and $C_s=C_s\times 2$, if chroma format is 4:2:0; and wherein the luminance difference data comprises a summation of luminance differences for each macroblock of the at least one macroblock compared with luminance values of its reference macroblock, Ys being determined as:

$$Y_s = \sum_{i=0}^{i=16} \sum_{j=0}^{j=16} |CurY_{ij} - RefY_{ij}|$$

wherein

Cur Y=luminance values for current macroblock

Ref Y=luminance values for reference macroblock.

13. The system of claim 8, wherein said means for evaluating comprises means for fetching best match reference data from a reference picture, and means for obtaining a chrominance difference for each pixel of each macroblock of the at least one macroblock, said chrominance difference comprising a chrominance value of the current macroblock pixel less a chrominance value of the corresponding reference macroblock pixel, and wherein said means for evaluating further comprises means for summing the absolute values of the chrominance differences for the pixels of the at least one macroblock to arrive at a summation of the chrominance difference data, and means for determining whether the summation of the chrominance difference data is greater than a predefined chrominance threshold, and if so, then proceeding with said switching of the coding decision for the at least one macroblock from non-intra to intra.

14. The system of claim 8, further comprising means for repeating the encoding for multiple frames of the sequence of video frames.

15. At least one program storage device readable by a machine, tangibly embodying at least one program of instructions executable by the machine to perform a method of encoding macroblocks of at least one frame of a sequence of video frames, the method comprising:

encoding macroblocks of a frame of a sequence of video frames, said encoding comprising for at least one macroblock of the frame:

(i) deciding, using luminance data of the at least one macroblock, to code the at least one macroblock as a non-intra macroblock; and (ii) switching the coding decision for the at least one macroblock from non-intra to intra upon evaluating chrominance data of the at least one macroblock.

16. The at least one program storage device of claim 15, wherein the evaluating of the chrominance data of the at least one macroblock comprises creating chrominance difference data by comparing chrominance values of a current macroblock of the at least one macroblock with chrominance values of a best matching reference macroblock, and determining whether the chrominance difference data is greater than a set chrominance difference threshold.

17. The at least one program storage device of claim 16, wherein the chrominance difference threshold is user set.

18. The at least one program storage device of claim 16, wherein the evaluating further comprises obtaining luminance difference data for the current macroblock of the at least one macroblock by comparing luminance data of the current macroblock and luminance data of the best matching reference macroblock, and determining whether the chrominance difference data is greater than the luminance difference data, wherein said switching occurs if the chrominance difference data is greater than said chrominance difference threshold, and the chrominance difference data is greater than the luminance difference data.

19. The at least one program storage device of claim 18, wherein the chrominance difference data comprises the sum of chrominance difference values of each macroblock of the at least one macroblock compared with chrominance values of its reference macroblock by the equation:

$$C_s = \sum_{i=0}^{i=n} \sum_{j=0}^{j=8} \left[\left(\left|CurC_{b_{ij}} - RefC_{b_{ij}}\right|\right) + \left(\left|CurC_{r_{ij}} - RefC_{r_{ij}}\right|\right)\right]$$

wherein n=8 if 4:2:0 chroma format n=16 if 4:2:2 chroma format

Cur Cb, Cur Cr=current chroma macroblock (8×n)

Ref Cb, Ref Cr=reference chroma macroblock (8×n), and $C_s=C_s\times 2$, if chroma format is 4:2:0; and wherein the luminance difference data comprises a summation of luminance differences for each macroblock of the at least one macroblock compared with luminance values of its reference macroblock, Ys being determined as:

$$Y_s = \sum_{i=0}^{i=16} \sum_{j=0}^{j=16} |CurY_{ij} - RefY_{ij}|$$

wherein

Cur Y=luminance values for current macroblock

Ref Y=luminance values for reference macroblock.

20. The at least one program storage device of claim 15, wherein said evaluating comprises fetching best match reference data from a reference picture, and obtaining a chrominance difference for each pixel of each macroblock of the at least one macroblock, said chrominance difference comprising a chrominance value of the current macroblock pixel less a chrominance value of the corresponding reference macroblock pixel, and wherein said evaluating further comprises summing the absolute values of the chrominance differences for the pixels of the at least one macroblock to arrive at a summation of the chrominance difference data, and determining whether the summation of the chrominance difference data is greater than a predefined chrominance threshold, and if so, then proceeding with said switching of the coding decision for the at least one macroblock from non-intra to intra.

* * * * *